Patented Oct. 22, 1940

2,218,553

UNITED STATES PATENT OFFICE 2,218,553

OIL-SOLUBLE POLYBASIC ACID RESIN

Israel Rosenblum, New York, N. Y.

No Drawing. Application June 5, 1935,
Serial No. 25,130

8 Claims. (Cl. 260—22)

The present invention relates to oil-acid modified alkyd resins and has for its general object to provide an improved resin of this type whose polybasic acid component is composed either entirely or in part of a dibasic aliphatic acid, such as succinic, and particularly maleic acid.

I have found that the dibasic aliphatic acids, and particularly maleic acid, exert a very desirable influence upon alkyd resins containing the same in chemical combination. For example, the resinous products obtained in accordance with the present invention and containing maleic acid are characterized in particular by a lighter color and a better color retention than is the case with the known alkyd resins composed of glycerol, phthalic acid and the acids of a fatty oil, and when brought into solution in conjunction with white pigments they are capable of yielding very white, air-drying and baking coating compositions. My improved products furthermore have in many cases greater durability and a higher degree of water-proofness than known resins of the polyhydric alcohol, polybasic acid type. My improved resins are soluble in drying, semi-drying, and non-drying oils; in many cases this solubility is so great that the resin can be incorporated with the oil at relatively low temperatures, namely below 100° C. and even at approximately room temperature. The resins are compatible also with various other synthetic resins, oil varnishes, etc., and when the content of the oil acid component is relatively low they mix readily with nitrocellulose lacquers.

The present application is a continuation in part of my copending applications Ser. No. 506,298 filed Jan. 2, 1931 now Patent No. 2,081,154; Ser. No. 702,366 filed Dec. 14, 1933 now Patent No. 2,004,880; Ser. No. 708,477 filed Jan. 26, 1934 now Patent No. 2,103,273 and Ser. No. 732,625 filed June 27, 1934 now Patent No. 2,088,612.

Investigation has shown that in spite of the assertions in the patent and other literature to the contrary, the dibasic aliphatic acids are not equivalent to phthalic acid in the reaction involving the heating together of glycerol, phthalic acid, and the acids of a fatty oil or of a fat. Although the dibasic aliphatic acids and phthalic acid are equivalents in a binary system in which glycerol is heated with a dibasic acid in the absence of the acids of a fatty triglyceride, such equivalence does not exist in the ternary system which includes also, as a reacting component, the acids of such triglyceride, in quantity sufficient to make the product oil-soluble. Thus, when it is attempted to heat together glycerol, maleic acid, and the acids of linseed oil, there is obtained a two-layer system which cannot be made to fuse into a homogeneous mass, and continued heating with vigorous stirring results only in charring of the lower layer. Similarly, when glycerol and a dibasic aliphatic acid, such as maleic and succinic acids which are the only common acids of this group, are first reacted and the acids of a fatty triglyceride then added and the heating continued, the last-named acids cannot be made to enter the resin molecule to any appreciable extent, the result being that heating causes further condensation of the glycerol-dibasic acid resin and ultimately the latter chars. In the case of phthalic acid, on the other hand, it is well known that such acid can be reacted simultaneously with the glycerine and fatty oil acids, or it may be reacted first with the glycerine and the condensate then heated with the oil acids, and a homogeneous useful product will result. The same is not true of the dibasic aliphatic acids named above.

I have also found that even when a dibasic aliphatic acid is employed in conjunction with phthalic acid, no arbitrary proportions of these acids can be used. Thus, in a reaction involving the simultaneous heating of glycerol, phthalic acid, maleic acid, and a quantity of the acids of a fatty oil sufficient to make the product oil-soluble if the dibasic acid were all phthalic acid, a molecular proportion of phthalic acid to maleic acid (assuming a quantity of glycerol substantially sufficient to neutralize all of the acids) of say 2 or 3 or more to 1, will yield two immiscible layers or materials no matter how carefully the reacting substances are heated and stirred.

It is doubtless for these reasons that the dibasic aliphatic acids have never found application in the production of oil-soluble, oil-acid modified alkyl resins, for so far as I am aware there has never, prior to my invention, appeared upon the market an oil-soluble alkyl resin containing a dibasic aliphatic acid or at any rate enough of such acid to affect the properties of the resin.

After several long series of investigations I have discovered conditions and reactions by the aid of which different amounts of the polybasic aliphatic acid can be incorporated in an oil-soluble alkyd resin. I have found that although it is impossible to produce a homogeneous useful resin by reacting simultaneously, for example, glycerol, maleic acid, and the acids of a fatty oil, an excellent resin having many advantages of a glycerol-phthalic acid-oil acid resin can be obtained by the simultaneous reaction of glycerol, maleic acid, phthalic acid and oil acid provided that the molecular proportion of maleic acid to phthalic acid is no greater than approximately 1:1. On the other hand I have found that if a volatile aliphatic acid, such as formic acid or acetic acid is present the dibasic acid may consist entirely of maleic or other dibasic aliphatic acid which otherwise would produce a non-homogeneous system. The following examples include several illustrations of each of the above-indicated methods for producing oil-soluble oil-acid modified alkyd resin containing various proportions of dibasic aliphatic acids. In each instance the process is so conducted that the product will have as low an acid number as possible, the reaction being continued until a satisfactory low acid number is obtained without danger of converting the material into an insoluble gel.

Examples 1 to 4 illustrate satisfactory procedures for obtaining products in accordance with the invention by the simultaneous heating of glycerol, a dibasic aliphatic acid, phthalic acid and the acids of a fatty oil. In these examples column A represents the formula employed according to the invention, while column B indicates the results obtained with the same formula except that the maleic acid is replaced with an equimolecular quantity of phthalic acid, so that the molecular relationship between fatty oil acid, dibasic acid and glycerol remains the same. In each case the temperature was raised gradually to about 240° C., the mass being stirred to insure uniformity of temperature and to facilitate removal of volatile material. The proportions of the reacting materials are approximately the theoretical amounts required to produce a neutral product, the glycerol being, however, generally used, in slight excess to allow for impurities and for losses during the heating.

*Example 1*

| | A | B |
|---|---|---|
| Soya bean oil fatty acids | 1.5 mols (420 grs.) | 1.5 mols (420 grs.). |
| Phthalic anhydride | 1 mol (148 grs.) | 1.2 mols (178 grs.). |
| Maleic acid | 0.2 mol (23 grs.) | |
| Glycerol | 1.4 mols (129 grs.) | 1.4 mols (129 grs.). |
| Duration of heating at 240° C | 20 hours | 40 hours. |
| Acid No | 8 | 8. |
| Viscosity in (1:1) varnolene solution | Tube T (Gardner-Holdt scale) | Less than tube A after 60 hours practically no change in viscosity. |

In this example the maleic acid is 15.5% by weight of the phthalic anhydride. The material is a plastic, soluble in all common varnish solvents including drying, semi-drying and non-drying oils and the solutions are miscible with varnish and resin solutions, thus producing coatings suitable for varnishes, enamels and paint, air-drying as well as baking, preferably employed with a drier. The product is soluble also in the solvent acetates (butyl, amyl, etc.), and in addition to having a higher viscosity, that is, a better body than a corresponding resin made only with phthalic acid, it is considerably lighter in color and much more suited for the production of pure white coating compositions with white pigments.

*Example 2*

| | A | B |
|---|---|---|
| Soya bean oil fatty acids | 2 mols (560 grs.) | 2 mols. (560 grs.). |
| Phthalic anhydride | 1 mol (148 grs.) | 1.3 mols. (192 grs.). |
| Maleic acid | 0.3 mol (35 grs.) | |
| Glycerol | 1.6 mols (147 grs.) | 1.6 mols. (1 7 grs.). |
| Duration of heating at 240° C. | 25 hours | 75 hours. |
| Acid number | 10.5 | 10. |
| Viscosity in (1:1) varnolene solution | Tube E (Gardner-Holdt scale) | Lighter than tube A. |

The maleic acid in this example is about 24% by weight of the phthalic anhydride. The material is a soft plastic, soluble in all common varnish solvents, including the fatty oils, and is compatible with other varnishes and resin solutions. As in the case of Example 1, it not only has a better body but a lighter color than a corresponding resin containing only phthalic acid.

*Example 3*

| | A | B |
|---|---|---|
| Soya bean oil fatty acid | 2 mols. (560 grs.) | 2 mols. (560 grs.). |
| Phthalic anhydride | 0.4 mols. (59 grs.) | 0.8 mols. (118 grs.). |
| Maleic acid | 0.4 mols. (46 grs.) | |
| Glycerol | 1.3 mols. (120 grs.) | 1.3 mols. (120 grs.). |
| Duration of heating at 240° C. | 25 hours | 75 hours. |
| Acid number | 10 | 10. |
| Viscosity | Heavier than tube T (Gardner-Holdt scale). | Tube O. |

In this example the maleic acid is 80% by weight of the phthalic anhydride. The viscosity was determined on the plastics as such. The viscosity of product B, after 75 hours' heating, was only about ⅛ that of product A after 25 hours' heating. The product B was also much darker than that of the A product.

The resin is a soft plastic, soluble in all common varnish solvents and compatible with other varnish resins and varnishes such as ester gum varnishes.

*Example 4*

Like Examples 1, 2 or 3, with the exception that the soya bean oil fatty acid is substituted in whole or in part by the acids of linseed oil, perilla oil, wood oil, poppyseed oil, cottonseed oil, olive oil, castor oil, sunflower oil, corn oil, sesame oil, rapeseed oil, rubberseed oil, fish oil, or other oil and fat acids. Products similar to those according to Examples 1, 2 and 3 are obtained, their properties being slightly modified by the character of the fatty oil acid used. Thus the acids of drying oils will yield products having better drying qualities than will the acids of non-drying oils and of fats and are generally preferred.

It will be seen from the above examples that the maximum proportion of maleic acid to phthalic acid or anhydride is approximately equimolecular when the materials are reacted simultaneously. I have found that considerably larger quantities of maleic acid with reference to phthalic acid cannot safely be used even if the relative quantities of glycerol and fatty oil acid are changed, e. g., increased.

In the above examples the maleic acid can, of course, be replaced by its anhydride, and it can also be replaced in whole or in part by other dibasic aliphatic acids, such as succinic acid. This substitution is illustrated by the following examples:

Example 5

| | | |
|---|---|---|
| Linoleic fatty acids | 1 mol. | (280 gms.) |
| Phthalic anhydride | 1 mol. | (148 gms.) |
| Succinic anhydride | 0.15 mol. | (15 gms.) |
| Glycerol | 1.25 mols. | (115 gms.) |

This mixture, in which the succinic anhydride is about 10% by weight of the phthalic anhydride and about 9% of excess glycerol over the equivalent proportion theoretically required for complete neutralization is employed, is heated gradually to about 230° C. and kept at that temperature until the desired low acid number and the desired viscosity are obtained. The material is a clear plastic, soluble in all common varnish solvents, and the solutions are miscible with varnish oils, varnishes and resin solutions. The solutions of the plastic can be used by themselves or in mixture with others as coatings and as vehicles for enamels, paints, etc. The coatings are pale, durable and of remarkable flexibility, elasticity and adhesion. They can be used for air-drying as well as baking finishes. The operation is carried out preferably in a neutral atmosphere.

Example 6

| | | |
|---|---|---|
| Linoleic fatty acids | 1 mol. | (280 gms.) |
| Phthalic anhydride | ½ mol. | (74 gms.) |
| Succinic anhydride | ½ mol. | (50 gms.) |
| Glycerol | 1.1 mol. | (101 gms.) |

The operation is carried out as in Example 5. This 1:1 molecular ratio of succinic acid to phthalic acid is practically the limit for the amount of succinic acid that may be used with enough fatty oil acid or fat acid to render the product oil-soluble and yet yield a homogeneous, useful resin. A clear, uniform resin is obtained with the above proportions of materials, the resin being soluble in common solvents and compatible with fatty oils. A low acid number (about 20) and a satisfactory viscosity are obtained with safety, that is, without danger of gelling.

Example 7

| | | |
|---|---|---|
| Linoleic fatty acids | 1 mol. | (280 gms.) |
| Phthalic anhydride | ½ mol. | (74 gms.) |
| Succinic anhydride | ¼ mol. | (25 gms.) |
| Maleic anhydride | ¼ mol. | (24 gms.) |
| Glycerol | 1.1 mol. | (101 gms.) |

The operation is conducted as in Example No. 5. The reaction proceeds rapidly and is completed in considerably shorter time than in Example 6. A resin of the same commercial viscosity and low acid number is obtained, giving in solution very hard and elastic coatings of outstanding paleness.

Example 8

| | | |
|---|---|---|
| Linoleic fatty acid | 1 mol. | (280 gms.) |
| Phthalic anhydride | 0.5 mol. | (74 gms.) |
| Succinic anhydride | 0.15 mol. | (15 gms.) |
| Glycerine | 1.3 mol. | (120 gms.) | are heated gradually to about 200° C. for a short time until a uniform system without layers is obtained. There are then added:

| | | |
|---|---|---|
| Phthalic anhydride | 0.5 mol. | (74 gms.) |
| Maleic anhydride | 0.08 mol. | (8 gms.) | and the reaction continued at about 280° C. until a uniform, resinous product is obtained. In this example the succinic anhydride is about 10% by weight of the phthalic anhydride and the maleic anhydride is 5%. The operation is performed in two steps, leading in the end to a resin of the same general characteristics as in Example 7.

Example 9

When it is attempted to produce the oil acid modified oil-soluble alkyd resin, containing dibasic aliphatic acid, in two steps, by first reacting the glycerol with the dibasic acids until a resinous intermediate product is obtained, followed by heating with the oil acid, a non-homogeneous useless product will be obtained unless, in accordance with the present invention, the amount of dibasic aliphatic acid is kept low. Where the molecular proportion of dibasic aliphatic acid to phthalic acid is approximately 1:1, the glycerol must not be heated with the dibasic acids to the point where a resinous condensate is obtained but may be heated to only a very limited extent; in fact, to only so small a degree that most of the glycerine and the acids are free when the fatty oil acids are added so that in effect the process really involves a single step. Thus when the following mixture

| | | |
|---|---|---|
| Phthalic anhydride | 0.5 mol. | (74 gms.) |
| Succinic anhydride | 0.5 mol. | (50 gms.) |
| Glycerol | 1.1 mol. | (101 gms.) | is heated prior to the addition of the fatty oil acid, great precautions must be taken to avoid any considerable degree of reaction.

The heating may be conducted to the point where the mixture is uniform and gives a clear mass when placed on glass. Thus, the mixture may be quickly heated to about 140° C. and there are then immediately added 280 grams (1 mol) of linoleic (linseed oil) fatty acids. The heating may now be continued with stirring to about 230° until a uniform, one phase system is obtained. The heating is continued until the desired viscosity is obtained. A product similar to that of Example 6 is secured.

I have found, however, that where, for example, one mol of phthalic anhydride, three mols of succinic or maleic acids or mixture of the two are first heated with an equivalent proportion of glycerol until a resinous material is obtained, the product can not be made to react to any substantial degree with the acids of a fatty oil; at least not to the degree necessary to produce a homogeneous oil-soluble material. Thus, even when the process is modified in the manner indicated, the amount of polybasic acid that may be used is limited, notwithstanding the statements in prior patents that phthalic acid and the polybasic aliphatic acids are full equivalents.

It is of advantage to employ a mixture of maleic and succinic acids since the first aids in producing a very pale material of the desired viscosity in a relatively short period of time while the succinic acid contributes to the flexibility of the films made with the final product.

With the aid of a readily volatile low molecular weight monobasic aliphatic acid, preferably one having no more than 5 carbon atoms, such as formic and acetic acids, a homogeneous resin can be obtained by the simultaneous heating of glycerol, fatty oil acids, and a dibasic aliphatic acid. The reaction is preferably so conducted that substantially all of the volatile fatty acid is expelled. This mode of preparing an oil-soluble alkyd resin whose polybasic acid is composed entirely or in large part of a dibasic aliphatic acid or mixture of such acids, is illustrated in the following examples:

Example 10

| | | |
|---|---|---|
| Linseed oil fatty acids | 1 mol. | (280 grams) |
| Formic acid | 1 mol. | ( 46 grams) |
| Maleic anhydride | 0.5 mol. | ( 49 grams) |
| Glycerol | 1 mol. | ( 92 grams) | are heated to approximately 230° C. and kept at such temperature for about 1½ hours. A homogeneous resinous product is obtained having an acid number of 36. The resin is soluble in petroleum and coal tar solvents and is compatible with linseed oil in all proportions at room temperature.

Example 11

| | | |
|---|---|---|
| Linseed oil fatty acids | 1 mol. | (280 grams) |
| Formic acid | 3 mols. | (138 grams) |
| Maleic anhydride | 1 mol. | ( 98 grams) |
| Glycerol | 2 mols. | (184 grams) | are heated to 210°–230° C. The layers which form at first gradually disappear and a uniform, clear material is obtained. After about one hour at the above temperatures the acid number falls to 33. The resin is soluble in coal tar solvents and in mixtures of coal tar and petroleum solvents and is compatible with linseed oil in limited proportions.

Example 12

| | | |
|---|---|---|
| Linseed oil fatty acids | 1 mol. | (380 grams) |
| Acetic anhydride | ½ mol. | ( 51 grams) |
| Maleic anhydride | ½ mol. | ( 49 grams) |
| Glycerol | 1 mol. | ( 92 grams) | are heated to 230°. The lower layer which forms at first is gradually dissolved as the reaction proceeds. After about 2½ hours at this temperature an acid number of 24 is reached. The resin is soluble in petroleum solvents and in coal tar solvents, and is compatible with linseed oil in all proportions at room temperature, and also with natural and synthetic resins and with oil varnishes.

Example 13

| | | |
|---|---|---|
| Linseed oil fatty acids | 1 mol. | (280 grams) |
| Acetic anhydride | 1½ mols. | (153 grams) |
| Maleic anhydride | 1 mol. | ( 98 grams) |
| Glycerol | 2 mols. | (184 grams) | are heated to 230° C., the reaction proceeding as in Example 12. After about one hour at this temperature an acid number of 26 is reached. The resin is soluble in coal tar solvents and in mixtures of coal tar solvents with petroleum solvents; it is also compatible with linseed oil in limited proportions, and with natural and synthetic resins and varnishes.

Example 14

| | | |
|---|---|---|
| Linseed oil fatty acids | 1 mol. | (280 grams) |
| Acetic acid | 2 mols. | (120 grams) |
| Maleic anhydride | 1½ mols. | (147 grams) |
| Glycerol | 2 mols. | (184 grams) | on heating for about one hour at 230° gave a clear viscous resin, whose acid number is 50. It is soluble in coal tar solvents, and can stand the addition of a limited amount of petroleum solvents.

Example 15

| | | |
|---|---|---|
| Linseed oil fatty acids | 1 mol. | (280 grams) |
| Formic acid | 3 mols. | (138 grams) |
| Succinic acid | 1 mol. | (118 grams) |
| Glycerol | 2 mols. | (184 grams) | are heated to 230° C. and kept at such temperature for six hours. A practically neutral resin is obtained. It is soluble in all proportions in coal tar solvents and in mixtures of coal tar solvents with petroleum solvents and is compatible with linseed oil in all proportions.

Example 16

| | | |
|---|---|---|
| Oleic fatty acids | 1 mol. | (282 grams) |
| Formic acid | 3 mols. | (138 grams) |
| Maleic anhydride | 1 mol. | ( 98 grams) |
| Glycerol | 2 mols. | (184 grams) | are heated to 230° C. for about 2 hours. The layers which are at first observed gradually disappear at this temperature and a uniform, clear resin is obtained having an acid number of 15. It is soluble in coal tar solvents and stands the addition of petroleum solvents and is compatible with linseed oil at room temperature up to two parts of linseed oil to one of resin. This resin is considerably more soluble in common solvents such as petroleum solvent, coal tar solvents or mixtures of both and is compatible with considerably more linseed oil than the similar resin made with linseed oil fatty acids, as in Example 11. The resin is compatible also with other resins and with varnishes.

The materials can, if desired, be heated in the presence of a neutral solvent which enables the reaction to be carried on for a longer period of time and permits lower acid numbers to be reached. The maleic or equivalent acid can be replaced by a mixture of such acid and phthalic acid, including one in which the proportion of acids is such (for example, 4 mols. of maleic acid to 1 mol. of phthalic acid) as would produce two immiscible layers if reacted with the glycerol and the oil or fat acid in the absence of the volatile fatty acids. In place of the acids their anhydrides can, of course, be employed, while the linseed oil acids can be replaced in whole or in part by the acids of other drying oils or of semi-drying and non-drying oils.

The use of a neutral solvent and especially of a high boiling point solvent is described also in my copending application Ser. No. 732,625 wherein a dibasic aliphatic acid, the acids of a fatty oil and the reaction product of glycerol and acetic acid (which contains free glycerol) are heated together simultaneously to produce a homogeneous resinous product of relatively low acid number. In such process the presence of the high boiling point solvent permits the reaction mass to be heated long enough to expel substantially all of the acetic acid without reaching the gel condition.

As already indicated, the resinous materials produced in the manner hereinabove described and containing a dibasic aliphatic acid possess superior properties as compared with a resin whose polybasic acid consists entirely of phthalic acid. Thus resins containing maleic acid are characterized by a lighter color, better color retention and better body than a straight phthalic acid resin produced under similar conditions. Resins containing succinic acid, on the other hand, are characterized by an unusual degree of flexibility. All of the resins hereinabove described are soluble in varnish oils and are compatible with various natural and synthetic resins. Where the content of fatty oil acids is relatively low, the resins can be readily mixed with nitrocellulose lacquers. The resins are soluble in coal tar solvents, mixtures of coal tar solvents and petroleum distillates and in the other solvents and mixtures of solvents commonly employed in the art.

For most general purposes it is preferred to use a mixture of phthalic acid and one or more of the dibasic aliphatic acids above referred to, the latter being present in an amount comprising about 3 to 10% of the phthalic acid, as indicated in Example 5 hereinabove, and in Example 1 of my copending application Ser. No. 506,298 of which the present application is a continuation in part. For special purposes, however, the amount of dibasic aliphatic acid may be increased up to the total replacement of the phthalic acid according to the methods described above.

It will be understood that where hereinabove I refer to the use of linoleic acid such term is intended to cover also the mixture of acids obtained upon hydrolysis of linseed oil and not only the pure linoleic acid.

It will be noted that in all of the above examples, compatibility of the product with vegetable or fatty oils is secured by the aid of the acids of such oils or of fats, such acids being non-resinous in character. These acids yield products which are tougher, more flexible and lighter in color than those obtainable with other known acidic solubilizing agents, such as rosin.

I claim:

1. A glycerol resin rendered readily soluble in fatty oils entirely by the incorporation therein of acids obtainable on hydrolysis of a fatty triglyceride, said resin being a product of the simultaneous reaction of glycerol, the acids of a fatty triglyceride in the proportion of at least about 1 mol but less than 3 mols for every mol of glycerol, and resin-forming polybasic acid material including a substantial quantity of a polybasic aliphatic acid of the group consisting of maleic and succinic acids.

2. A glycerol resin rendered readily soluble in fatty oils entirely by the incorporation therein of acids obtainable on hydrolysis of a fatty triglyceride, said resin being a product of the simultaneous reaction of glycerol, the acids of a fatty triglyceride in the proportion of at least about 1 mol but less than 3 mols for every mol of glycerol, and polybasic acid material comprising a dibasic acid of the group consisting of maleic and succinic acids in an amount ranging from a substantial quantity to the total of such polybasic acid material, the remaining polybasic acid, if any, being phthalic acid.

3. An alkyd resin readily soluble in fatty oils and comprising the product of the simultaneous reaction of glycerol, maleic acid, phthalic acid, and the acids obtained upon hydrolysis of a drying oil, the last-named acids being in the proportion of at least about 1 mol but less than 3 mols for every mol of glycerol, the maleic acid being approximately 5 to 10% by weight of the phthalic acid.

4. A pale, homogeneous resin readily soluble in fatty oil and comprising the product of the simultaneous reaction of glycerol and acid resin constituents consisting entirely of maleic acid and the acids of a fatty oil, the last-named acids being in the proportion of at least about 1 mol but less than 3 mols for every mol of glycerol, said resin upon mixing with a solvent and a white pigment being capable of yielding pure white coatings.

5. A homogeneous resin comprising the product of the simultaneous reaction of glycerol, phthalic acid, a dibasic aliphatic acid of the group consisting of maleic and succinic acids, and the acids of a fatty triglyceride, the last-named acids being in the proportion of at least about 1 mol but less than 3 mols for every mol of glycerol, and the dibasic aliphatic acid being present in an amount comprising approximately 3 to 10% by weight of the phthalic acid, the amount of glycerol being approximately equivalent to the combined acids, and the resin being soluble in drying oils at temperatures as low as 100° C. and being soluble also in coal tar solvents and in mixtures of coal tar solvents and petroleum distillates.

6. A homogeneous resin soluble in fatty oils and comprising the product of the simultaneous reaction of glycerol, the acids of a fatty triglyceride in quantity sufficient to render the product soluble in fatty oils but less than equivalent to the glycerol, and resin-forming acid material consisting essentially of polycarboxylic acid including an acid of the group consisting of maleic and succinic acids.

7. A homogeneous resin soluble in fatty oils and comprising the product of the simultaneous reaction of glycerol, the acids obtainable on hydrolysis of a fatty triglyceride in quantity sufficient to render the product soluble in fatty oils but less than equivalent to the glycerol, and resin-forming acid material consisting essentially of phthalic acid and dibasic aliphatic acid of the group consisting of maleic and succinic acids, the last-named acid being present in a substantial quantity up to approximately equi-molecular proportions with reference to the phthalic acid.

8. An alkyd resin rendered readily soluble in fatty oils entirely by the incorporation therein of acids obtainable on hydrolysis of a fatty triglyceride, and comprising the product of the simultaneous reaction of glycerol, the acids obtainable on hydrolysis of a fatty tri-glyceride, and resin-forming acids consisting essentially of maleic acid, succinic acid and phthalic acid.

ISRAEL ROSENBLUM.